A. L. STEVENS.
LOCOMOTIVE ATTACHMENT.
APPLICATION FILED OCT. 27, 1913.
1,106,422.
Patented Aug. 11, 1914.
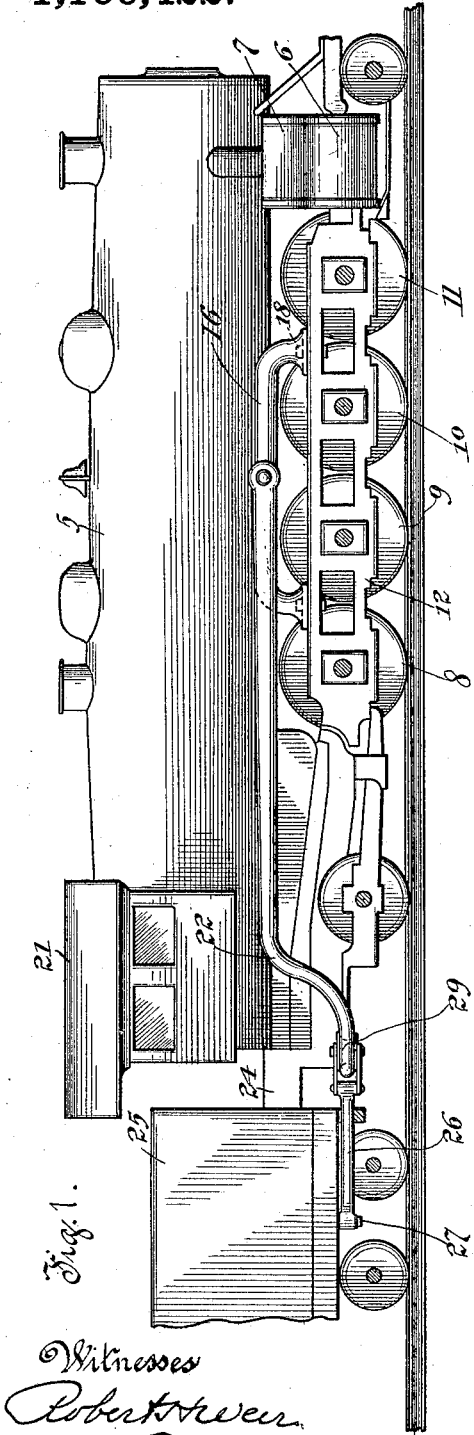
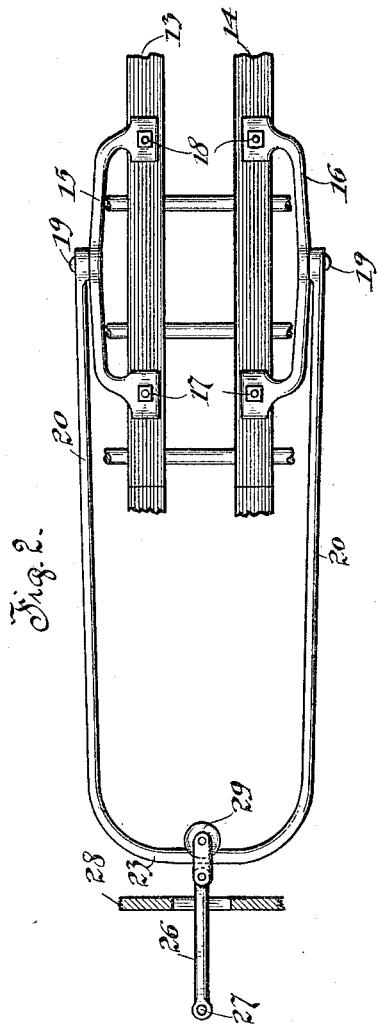

UNITED STATES PATENT OFFICE.

ALFRED L. STEVENS, OF CHICAGO, ILLINOIS.

LOCOMOTIVE ATTACHMENT.

1,106,422. Specification of Letters Patent. Patented Aug. 11, 1914.

Application filed October 27, 1913. Serial No. 797,433.

*To all whom it may concern:*

Be it known that I, ALFRED L. STEVENS, a citizen of the United States, residing at Chicago, in the county of Cook and State of Illinois, have invented certain new and useful Improvements in Locomotive Attachments, of which the following is a specification.

My invention relates to improvements in means for connecting a trailing load to a self propelled vehicle, such as a locomotive, or the like.

One of the objects of my invention is to provide means to connect a trailing load to a self propelled, traction, vehicle, in such manner as to produce and maintain maximum traction, or downwardly directed pressure of the traction wheels upon the rails or other paths of the roadway, by making the pull of the load contribute to this effect.

Other and further objects of my invention will become readily apparent, to persons skilled in the art, from a consideration of the following description when taken in conjunction with the drawings, wherein—

Figure 1 is a side elevation of a locomotive with my load connecting means applied thereto. Fig. 2 is a plan view of the connecting means.

In common practice the load of a locomotive, or like traction vehicle, is connected to the rear end thereof so that when the pull is exerted the maximum downwardly directed thrust is applied to the rear wheels with a tendency to lift up the front wheels, or to decrease their traction effect, and thus the load is not evenly distributed to the power or driving wheels, causing unequal efficiency and unnecessary slipping of the drive wheels. Especially is this true when the locomotive is climbing a grade. I overcome these objections by pivotally connecting the load at or near the longitudinal center of the wheel base, from which point the pull is exerted. By this means of connecting the load to a locomotive, the force of the pull, to a large extent, enhances or increases the down thrust of the drive wheels against the rails and thus the traction effect or pulling effort is increased and more evenly distributed to the respective drive wheels.

Another object of pivoting the locomotive to its load is to render the connection more flexible, and the locomotive more independent of its load. When the longitudinal rigidity of the locomotive and its load is relieved, as by the use of my invention, the locomotive will not invariably cause the trailing cars to leave the rails every time that it "jumps the track" and therefore this method of connection contributes to the safety of operation.

In the illustrative embodiment 5 represents the locomotive boiler provided with cylinders and steam chests 6 and 7 respectively.

8, 9, 10 and 11 are the respective pairs of drive wheels, or traction wheels, such as used in large locomotives, properly secured in a truck frame 12, which is connected to the boiler in the usual manner. Connected to the parallel members 13 and 14 of the truck frame are two yokes 15 and 16 having their free ends bolted thereto, as at 17 and 18. These yokes are similar in every respect and particular and each has a projecting stud 19 to which the connector 20 is pivotally attached. From these pivoted points the connector 20 continues rearwardly in lines substantially parallel with the underlying track rails until it reaches a point near the cab 21 where it is deflected downwardly, as at 22, and has its curved closed end 23, located below the running board 24 of the locomotive, for connection with the fuel tender 25. A draw bar 26 is pivotally connected to the tender, as at 27, and is provided with an underlying guide rail 28. It carries on its forward free end a pulley 29 which moves freely over the curved portion 23 of the connector 20 so as to provide for proper lateral movement of the engine 5 with respect to the tender 25 when going around curves, and so that the engine proper may leave the track without taking the tender and the trailing cars with it.

While I have herein shown a single embodiment of my invention for the purpose of clear disclosure it is manifest that considerable variations may be made, from the specific structure illustrated, within the scope of the appended claims.

Having described my invention, what I claim is:

1. In combination with a self propelled vehicle having a plurality of pairs of traction wheels, of a U-shaped load-pulling connecting means, having its free ends pivoted to opposite sides of said vehicle in vertical planes between said wheels, with its closed end extending to the rear of the vehicle, and a draw bar carrying a pulley for lateral movement across the closed end of said connecting means.

2. In combination with a locomotive having a plurality of pairs of traction wheels and axles therefor, of truck frames carrying the opposite ends of the axles, yokes secured to the truck frames and extending upwardly therefrom, a U-shaped load pulling connecting means having its free ends pivoted to the said yokes at each side of the locomotive in vertical plane between said traction wheels with its closed end extending to the rear of the locomotive and a laterally movable connecting means for attachment to the load, associated with said closed end.

In testimony whereof I hereunto set my hand in the presence of two witnesses.

ALFRED L. STEVENS.

In the presence of—
FORÉE BAIN,
MARY F. ALLEN.

---

Copies of this patent may be obtained for five cents each, by addressing the "Commissioner of Patents, Washington, D. C."